US006970793B2

(12) United States Patent
Pearson et al.

(10) Patent No.: US 6,970,793 B2
(45) Date of Patent: Nov. 29, 2005

(54) APPARATUS AND METHOD FOR DETECTING MALFUNCTIONS IN HIGH-PRESSURE FLUID PUMPS

(75) Inventors: Larry G. Pearson, Bonney Lake, WA (US); Aki Tanuma, Federal Way, WA (US); Charles M. Wakefield, Puyallup, WA (US)

(73) Assignee: Flow International Corporation, Kent, WA (US)

( * ) Notice: Subject to any disclaimer, the term of this patent is extended or adjusted under 35 U.S.C. 154(b) by 0 days.

(21) Appl. No.: 10/361,975

(22) Filed: Feb. 10, 2003

(65) Prior Publication Data

US 2004/0158419 A1 Aug. 12, 2004

(51) Int. Cl.$^7$ .............................................. G06F 19/00
(52) U.S. Cl. .......................................... 702/64; 417/63
(58) Field of Search ................................ 73/1.57, 1.59, 73/1.68, 168, 753; 417/53, 63, 44.2; 60/39.41; 700/175, 282, 301; 702/33, 35, 41, 50, 57, 702/66, 71, 75, 127, 138, 182, 183, 185, 702/189, 193, 51, 64

(56) References Cited

U.S. PATENT DOCUMENTS

| | | | |
|---|---|---|---|
| 4,705,459 A * | 11/1987 | Buisine et al. | |
| 5,106,267 A | 4/1992 | Kawamura et al. | ........... 417/45 |
| 5,499,538 A * | 3/1996 | Glidewell et al. | |
| 5,628,229 A * | 5/1997 | Krone et al. | |
| 5,668,457 A | 9/1997 | Motamed | ................... 318/606 |
| 5,678,521 A * | 10/1997 | Thompson et al. | |
| 5,720,598 A * | 2/1998 | de Chizzelle | |
| 5,772,403 A * | 6/1998 | Allison et al. | |
| 5,774,372 A * | 6/1998 | Berwanger | |
| 5,918,268 A * | 6/1999 | Lukas et al. | |
| 6,014,958 A * | 1/2000 | Miwa et al. | |
| 6,055,851 A | 5/2000 | Tanaka et al. | ................. 73/46 |
| 6,074,175 A * | 6/2000 | Hoshi et al. | |
| 6,092,370 A | 7/2000 | Tremoulet, Jr. et al. | ...... 60/328 |
| 6,210,127 B1 * | 4/2001 | Hoshi et al. | |
| 6,260,004 B1 * | 7/2001 | Hays et al. | |
| 6,330,525 B1 * | 12/2001 | Hays et al. | |
| 6,341,947 B1 * | 1/2002 | Otomo | ....................... 417/286 |
| 6,564,616 B2 * | 5/2003 | Antonioli et al. | ............ 73/49.7 |
| 6,678,584 B2 * | 1/2004 | Junk et al. | .................. 700/282 |

FOREIGN PATENT DOCUMENTS

WO     WO 02/079651 A1    10/2002

* cited by examiner

*Primary Examiner*—John Barlow
*Assistant Examiner*—Douglas N. Washburn
(74) *Attorney, Agent, or Firm*—Seed Intellectual Property Law Group PLLC

(57) ABSTRACT

A fluid pump system includes a pump having a plurality of cylinders, each having an outlet port coupled to a high-pressure manifold. A pressure transducer is coupled to the manifold and configured to convert pressure levels of fluid in the manifold to a voltage signal at an output of the transducer. The system further includes a digitizer configured to convert the voltage signal from the transducer to a digital signal at a digitizer output, such that when a value of the voltage signal is less than a selected reference voltage a first digital value is produced, and when the voltage level exceeds the selected reference voltage a second digital value is produced. A diagnostic circuit having an input coupled to the digitizer output is configured to detect malfunctions of the pump based upon characteristics of the digital signal.

27 Claims, 9 Drawing Sheets

APPARATUS AND METHOD FOR DETECTING MALFUNCTIONS IN HIGH-PRESSURE FLUID PUMPS

BACKGROUND OF THE INVENTION

1. Field of the Invention

The present invention relates to the field of high-pressure fluid pumps, and in particular, diagnosing malfunctions in high-pressure fluid pumps.

2. Description of the Related Art

High-pressure fluid pumps are used in various industrial applications. For example, a high-pressure pump may be used to provide a pressurized stream of water for cleaning and surface preparation of a wide variety of objects, from machine parts to ship hulls.

High-pressure pumps may also be used to provide a stream of pressurized water for water jet cutting. In such an application, a pump pressurizes a stream of water, which flows through an orifice to form a high-pressure fluid jet. If desired, the fluid stream may be mixed with abrasive particles to form an abrasive waterjet, which is then forced through a nozzle against a surface of material to be cut. Such cutting systems are commonly used to cut a wide variety of materials, including glass, ceramic, stone, and various metals, such as brass, aluminum, and stainless steel, to name a few. A single pump may be used to provide pressurized fluid to one or several tools.

Pumps of this type may develop fluid pressures exceeding 60,000 psi. FIG. 1 illustrates an example of such a pump. FIG. 1 shows a pump 100 having three cylinders 102. Each of the three cylinders 102 is coupled to a crankshaft 104 by a connecting rod 106. The connecting rods 106 are distributed on the crankshaft 104 in a known way, such that the plunger 108 of each of the cylinders cycles through a compression and intake cycle 120° ahead of one of the remaining plungers, and 120° behind the other remaining plunger. The pump 100 is coupled to a drive source (not shown) via a driveline 110. The drive source may be an electric motor, a diesel powered engine, or any other drive means capable of generating sufficient force.

As will be recognized, the operation of each one of the cylinders is substantially identical to that of the other two, albeit out of phase therewith. A detailed description of the operation of one such pump may be found in U.S. Pat. No. 6,092,370, issued on Jul. 25, 2000, in the name of Tremoulet, Jr. et al., which patent is incorporated herein in its entirety.

With reference now to FIG. 2, as described in the aforementioned patent, each cylinder 102 of the pump 100 includes an intake check valve 112, which permits fluid to enter the chamber 128 via an inlet port 114 during an intake stroke of the plunger 108; each cylinder 102 includes a primary seal 116 and static seals 118, which prevent fluid from escaping the chamber 128 during a pressurizing stroke of the plunger 108; and finally, each cylinder includes an outlet check valve 120, which vents pressurized fluid into an outlet chamber 122. From the outlet chamber 122, the pressurized fluid flows through an outlet port 124 to a high-pressure manifold 126, where fluid from each of the three cylinders 102 is collected, to be distributed to a tool or tools according to the requirements of the particular application.

A particular problem with such pump systems is detecting, and diagnosing, malfunctions of components of individual cylinders. As previously explained, such pumps may operate in pressure ranges up to, and exceeding, 70,000 psi.

In a condition where a load on a pump is less than the pump's maximum capacity, a failure of, for example, a static seal in one of a plurality of cylinders is not sufficient to show up as a drop in overall pressure at the high-pressure manifold, or at the tool or device being driven by fluid pressure. Nevertheless, such a failure reduces the overall capacity of the pump, such that, when an increased load is placed on the pump, it is not capable of providing its rated maximum output. Other types of malfunctions may do more than reduce the overall capacity of the pump, but may cause significant damage to the pump. For example, a failure of the outlet check valve 120 of one cylinder, such that the valve remains open during both the intake stroke and the pressurizing stroke of the plunger, will create a situation in which pressure from the high-pressure manifold drives fluid back into the cylinder during the intake stroke. Consequently, pressure within the cylinder remains at, or near, the rated output pressure of the pump. With such constant pressure on the plunger, components linking the plunger to the crankshaft are not effectively lubricated, resulting in friction, and eventual seizing of the pump. Thus, undetected breakdown of an inexpensive component may lead to catastrophic failure of the pump.

A known method of detecting such failures is through the placement of temperature sensors at various points on each of the cylinders. It is known that, in the case of many types of malfunctions, the malfunctioning device will generate heat in the valve casing immediately around that component. Thus, by monitoring temperature levels at various points on the pump body, malfunctions may be detected and diagnosed. The '370 patent, previously mentioned, describes such a method.

While the use of temperature sensors is superior to other known methods of fault detection, it does have some drawbacks. For example, heat build up, due to a malfunction, does not occur instantaneously. Thus, a problem cannot always be detected before serious damage to the pump occurs. Another problem is the complexity and cost of such a monitoring system. An effective monitoring system may include three or more sensors per cylinder. So, a pump having three cylinders will require up to nine sensors, together with the necessary signal conditioning circuitry and diagnostic circuitry for effective monitoring. During service the sensors must be removed, then reinstalled after servicing. Additionally, such systems must be calibrated with the particular pump and are prone to damage, as they are not robust in nature.

BRIEF SUMMARY OF THE INVENTION

According to an embodiment of the invention, a fluid pump system is provided. The system includes a pump having a plurality of cylinders, each of the cylinders having an outlet port. A high-pressure manifold, having a plurality of inlets, is coupled, via each of the inlets, to a respective one of the outlet ports. A pressure transducer having an input sensor coupled to the manifold is configured to convert pressure levels of fluid in the manifold to a voltage signal at an output of the transducer. The system further includes an analogue to digital converter having an input coupled to the output of the transducer and configured to convert the voltage signal from the transducer to a digital signal at an A/D output, such that when a value of the voltage signal is less than a selected reference voltage, a first digital value is produced, and when the voltage level exceeds the selected reference voltage, a second digital value is produced. The system also includes a diagnostic circuit having an input coupled to the A/D output and configured to detect malfunctions of the pump based upon characteristics of the digital signal.

According to an embodiment of the invention, the diagnostic circuit is configured to compare a frequency of the digital signal with a reference frequency, and to indicate a pump malfunction when the frequency of the digital signal does not match the reference frequency.

According to an embodiment of the invention, the reference frequency is derived from the revolutions per second of a crankshaft of the pump multiplied by the number of cylinders in the pump.

According to another embodiment of the invention, a method for detecting faults in a multi-cylinder pump is provided, including converting pressure levels at a high-pressure manifold of a multi-cylinder pump to a proportionate voltage signal, and detecting a malfunction in a component of one of the plurality of cylinders by examining an AC component of the voltage signal.

According to an embodiment of the invention, the method includes converting the AC component of the voltage signal to a digital signal and comparing a frequency of the digital signal to a reference frequency, wherein the reference frequency is correlated to a total number of compression strokes of all of the cylinders of the multi-cylinder pump, per second.

BRIEF DESCRIPTION OF THE SEVERAL VIEWS OF THE DRAWING(S)

Figure 1:
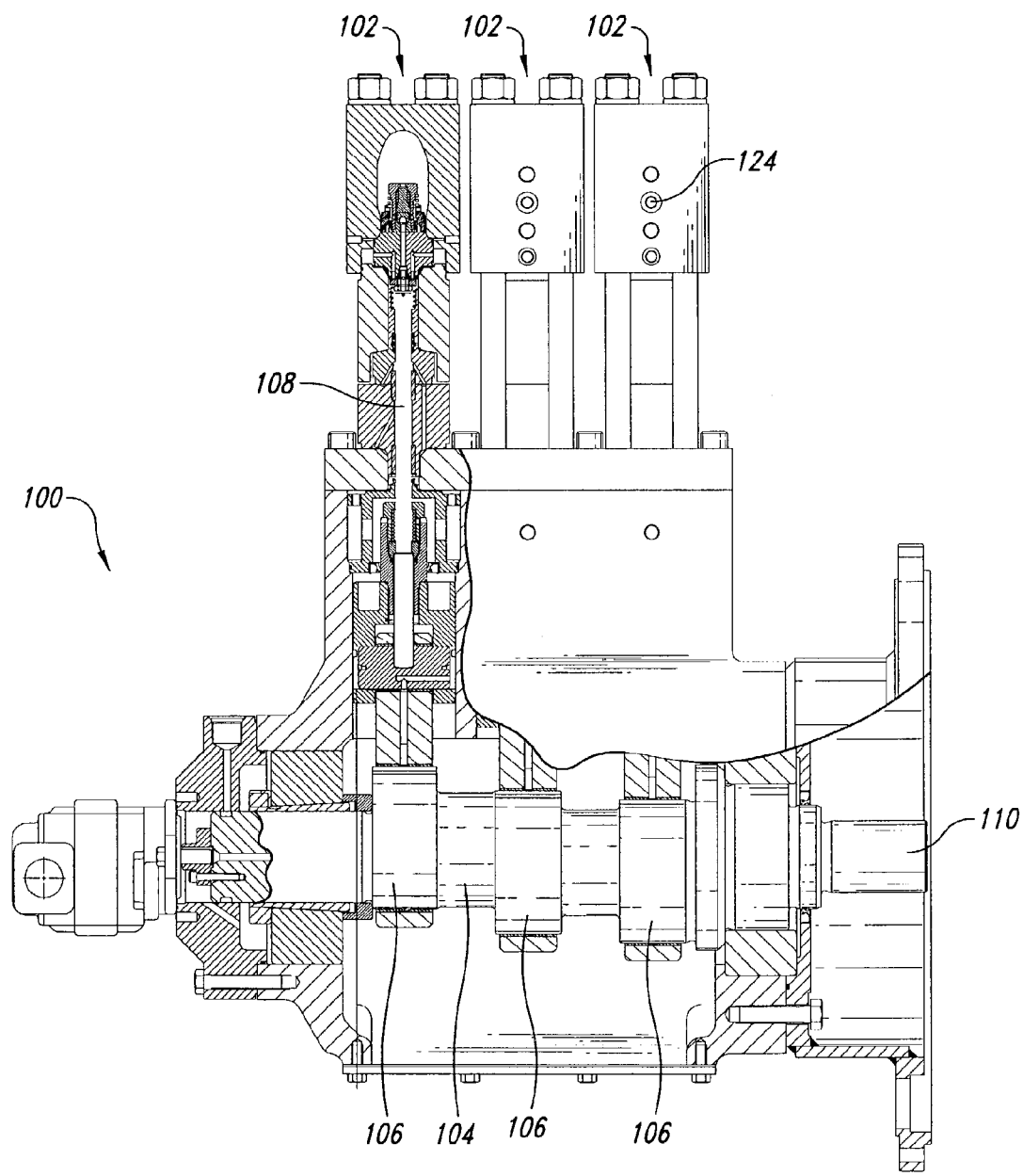
FIG. 1 is a partial cross-section of a multi-cylinder pump of a known type.
Figure 2:
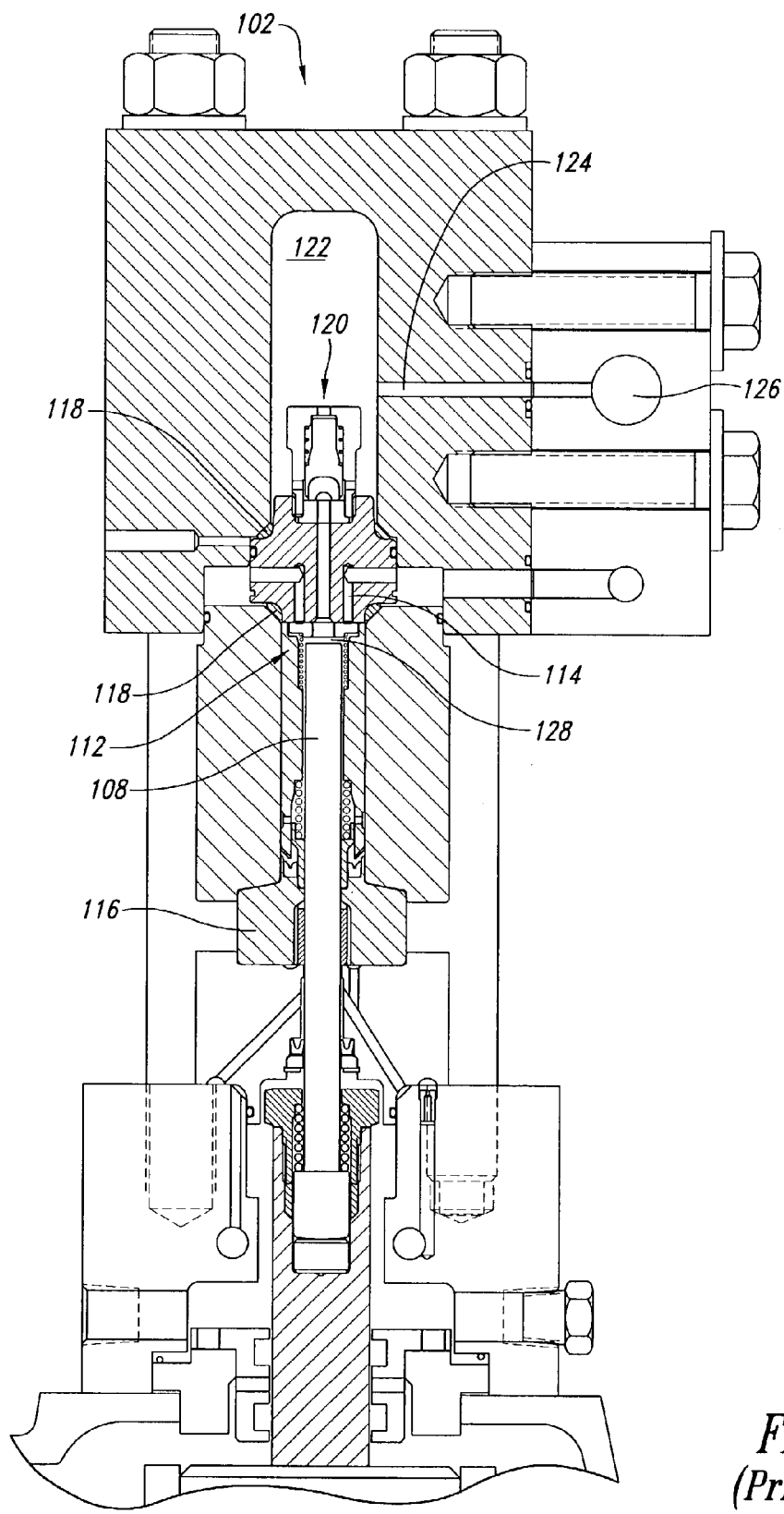
FIG. 2 is an enlarged cross-sectional view of a single cylinder of a pump of the type shown in FIG. 1.
Figure 3:
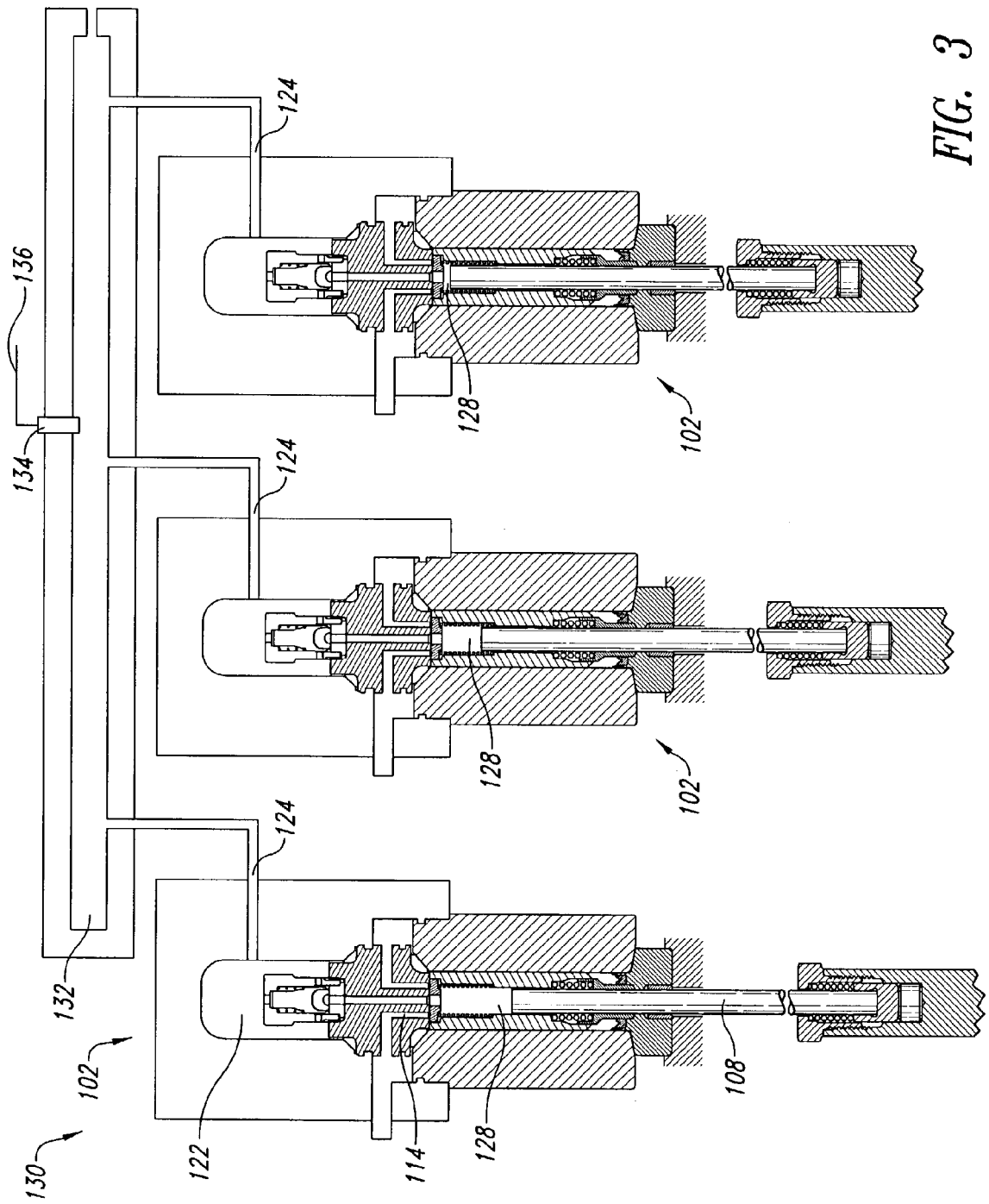
FIG. 3 is a cross-sectional view of the pump heads of a multi-cylinder pump according to an embodiment of the invention.
Figure 8:
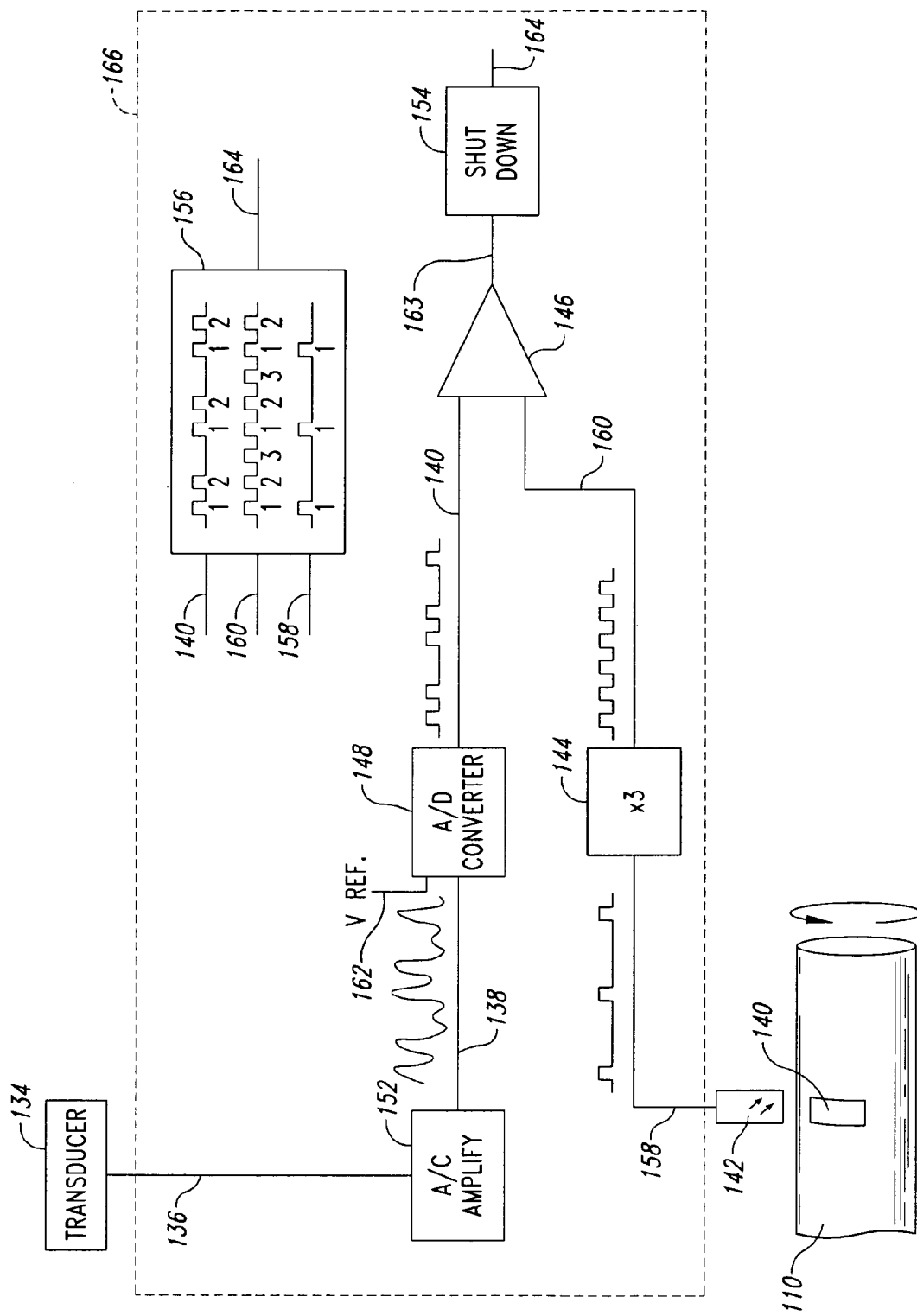
Figure 9:
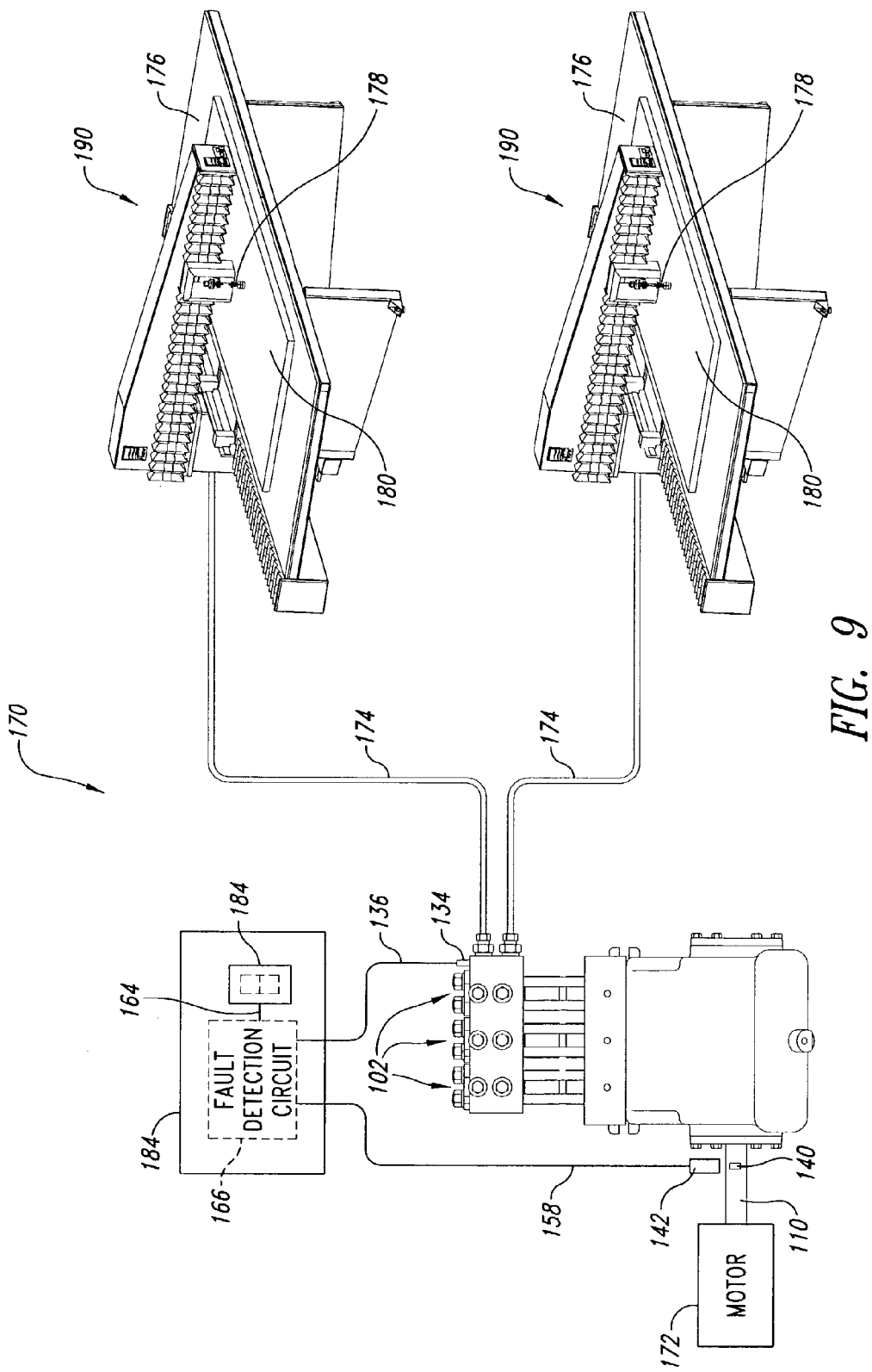

FIGS. 4, 5, 6, and 7 are graphs depicting the operation of the pump of FIG. 3 under various conditions, according to an embodiment of the invention;

FIG. 8 is a diagrammatic representation of the detection/diagnostic circuits according to an embodiment of the invention; and FIG. 9 is a diagrammatic representation of a high-pressure pump system, according to an embodiment of the invention.

DETAILED DESCRIPTION OF THE INVENTION

An embodiment of the invention will now be described with reference to FIGS. 3–7.

FIG. 3 represents a pump 130 having three cylinders 102, similar to that described previously, wherein the same reference numbers are used to indicate identical components. The pump 130 includes a high-pressure manifold 132, which is depicted as being above the pump 130. This is for purposes of illustration only. Typically, the high-pressure manifold is bolted, or otherwise coupled, to the sides of the pump heads. The high-pressure manifold 132 includes a pressure transducer 134, which is configured to provide a voltage output 136 that is proportionate to fluid pressure within the manifold 132.

While the term transducer is used herein, another term commonly used is transmitter. In general, the terms are distinguished in the industry in the following way. The term transducer is used to describe a device that converts a pressure signal to an unconditioned voltage output signal, while the term transmitter is used to refer to a device which also conditions the voltage output signal. A commonly used transmitter will provide an output signal in the ranges of 0–10 volts or 10–20 volts. So, for example, a pump that is rated to produce 60,000 psi may employ a transmitter configured to provide a 0–10 volt output of 6,000 psi/volt, so a pressure reading of the fully rated 60,000 psi will show as 10 volts on the output of the transmitter. Because the term transducer is the more generic, it will be used in describing the invention. However, it will be understood that it encompasses the more specific term, transmitter, as well as other terms indicating devices that perform similar functions.

Figure 4:
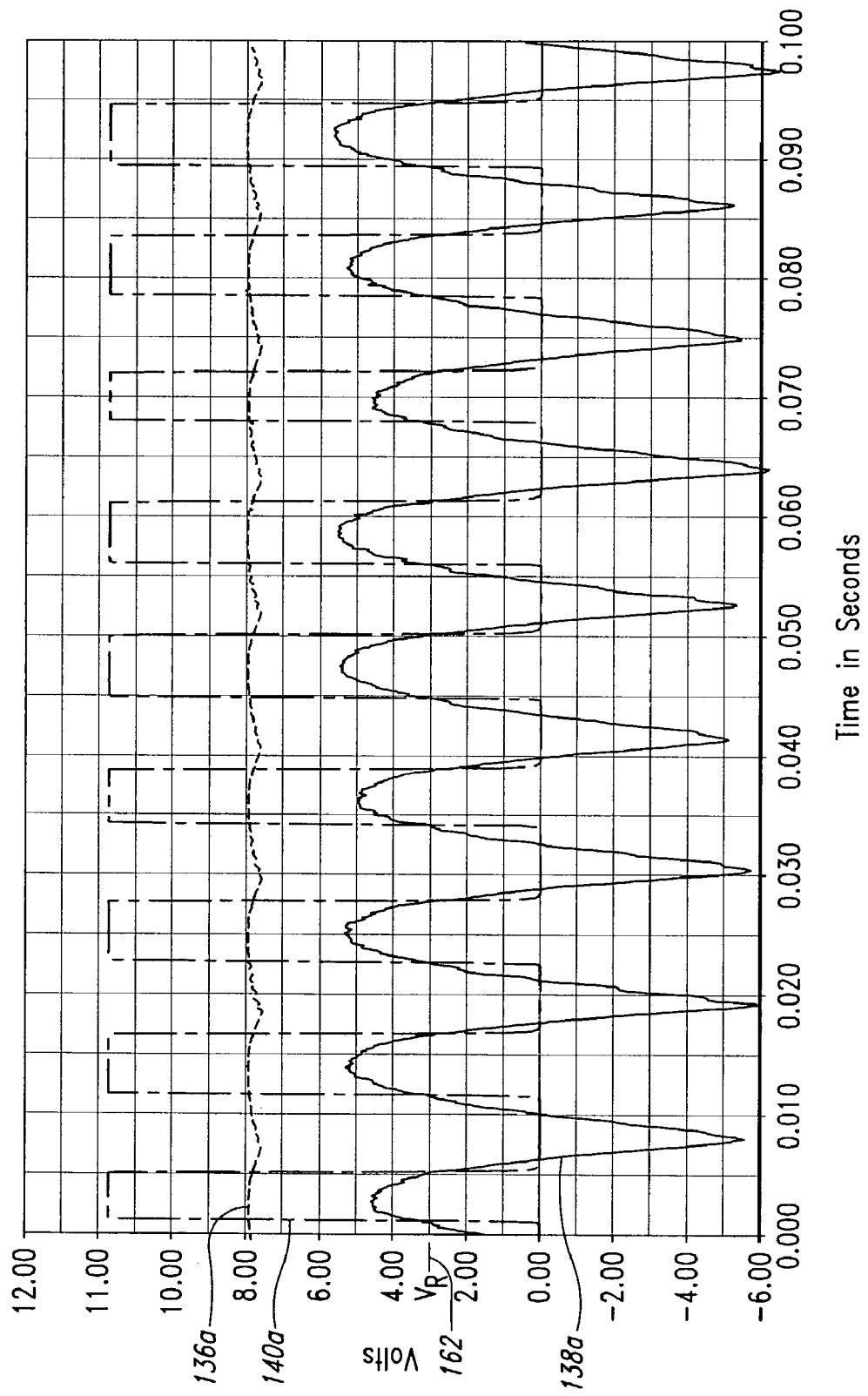

According to an embodiment of the invention, the transducer 134 provides an output voltage 136 proportionate to the fluid pressure within the manifold 132. FIG. 4 shows a graph in which the output voltage of the pressure transducer of a pump, operating within nominal specifications, is displayed as line 136a. It may be seen that the output voltage of the transducer 134 varies within a range of between about 7.75 and 8 volts. The AC component of the voltage of line 136a is separated from the DC component and amplified, resulting in the signal of line 138a. This signal 138a is then digitized, as follows: a reference voltage 162 is selected and a first digital value is produced while the voltage 138a remains below the reference voltage, and a second digital value is produced while the voltage 138a equals or exceeds the reference voltage. The result is a digital output as shown by line 140a. Each of the peaks of the transducer output 136a corresponds to the pressurizing stroke of the plunger of one of the three cylinders 102 of the pump 130.

Figure 5:
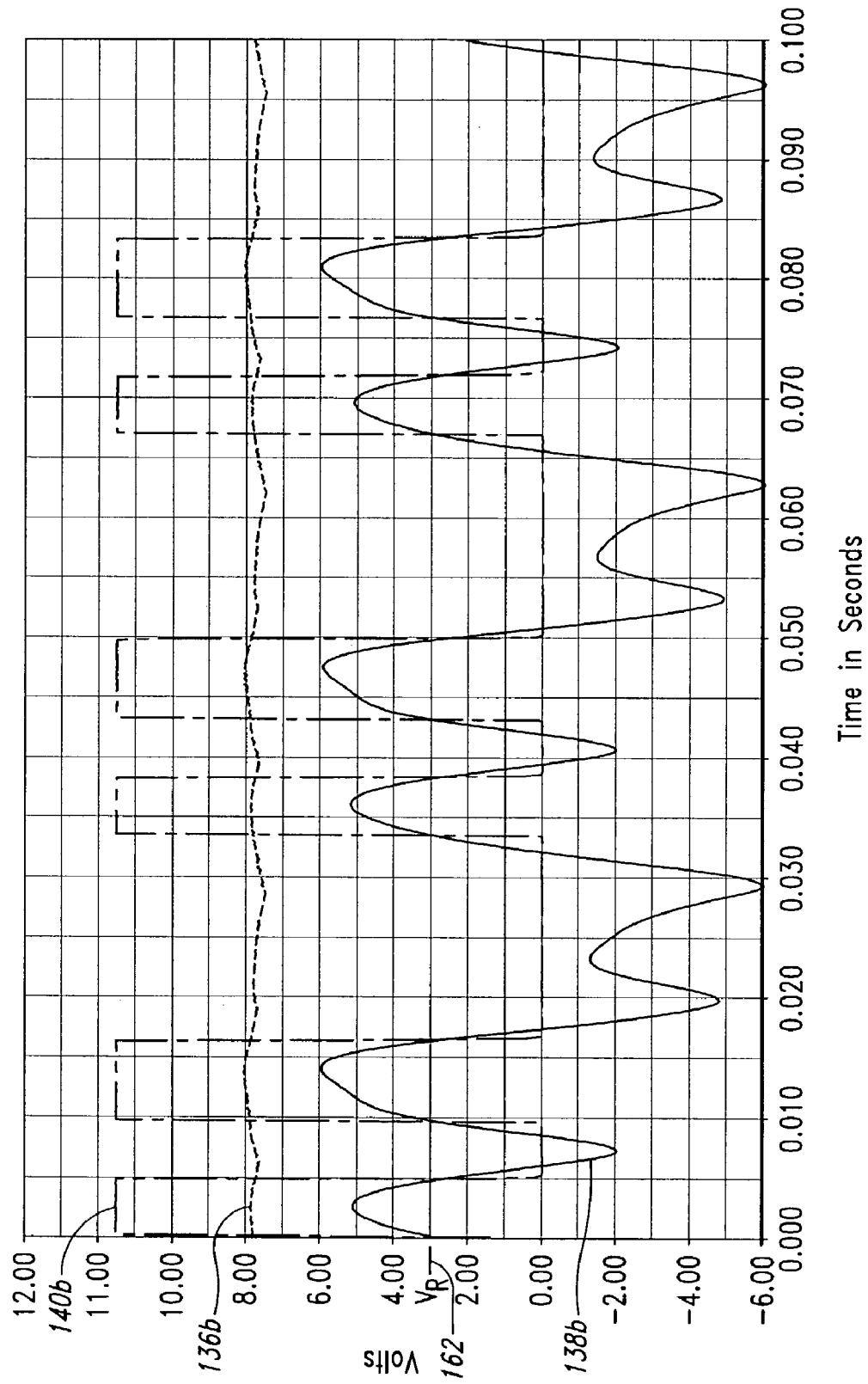

Referring now to FIG. 5, FIG. 5 is a similar graph depicting the operation of a pump 130 in which one of the seals 112 of one of the cylinders 102 has failed. As can be seen, the output 136b from the transducer 134 indicates that the overall fluid pressure in the manifold 132 remains normal. However, the character of the AC component of the output signal 136b is radically different from that of the signal 136a. Referring to the amplified AC component 138b of FIG. 5, it may be seen that, where previously the signal 138a had a fairly regular appearance, the amplified signal 138b of FIG. 5 shows an irregular signal in which every third peak is significantly lower than the other two. When this signal is digitized, resulting in the signal of line 140b, it may be seen that the third peak does not rise above the reference voltage 162, and consequently does not result in a change of digital state. As a result, the output 140b shows a signal having a frequency that is one-third lower than the frequency of the signal 140a of FIG. 4.

In the cases illustrated, the reference voltage 162 is about halfway between 0V and the peak voltage of the amplified signal 138 (about 3 volts, in these examples). The level of the reference voltage 162 is selected based upon a desired degree of sensitivity. It can be seen, referring to FIGS. 4–7, that if the reference voltage is moved higher, it will cause a much quicker response to a gradual deterioration of a component, as one of the peaks begins to drop. On the other hand, it may be more economical to permit a pump to continue running with a marginal valve or seal, until the component fails completely, especially in cases where the pump is not under a maximum load. In such a case, the reference voltage is placed at a lower level, to delay response until a more complete failure occurs. Laboratory tests using a reference voltage based upon the formula described above have produced satisfactory results, but other levels may be selected.

Figure 6:
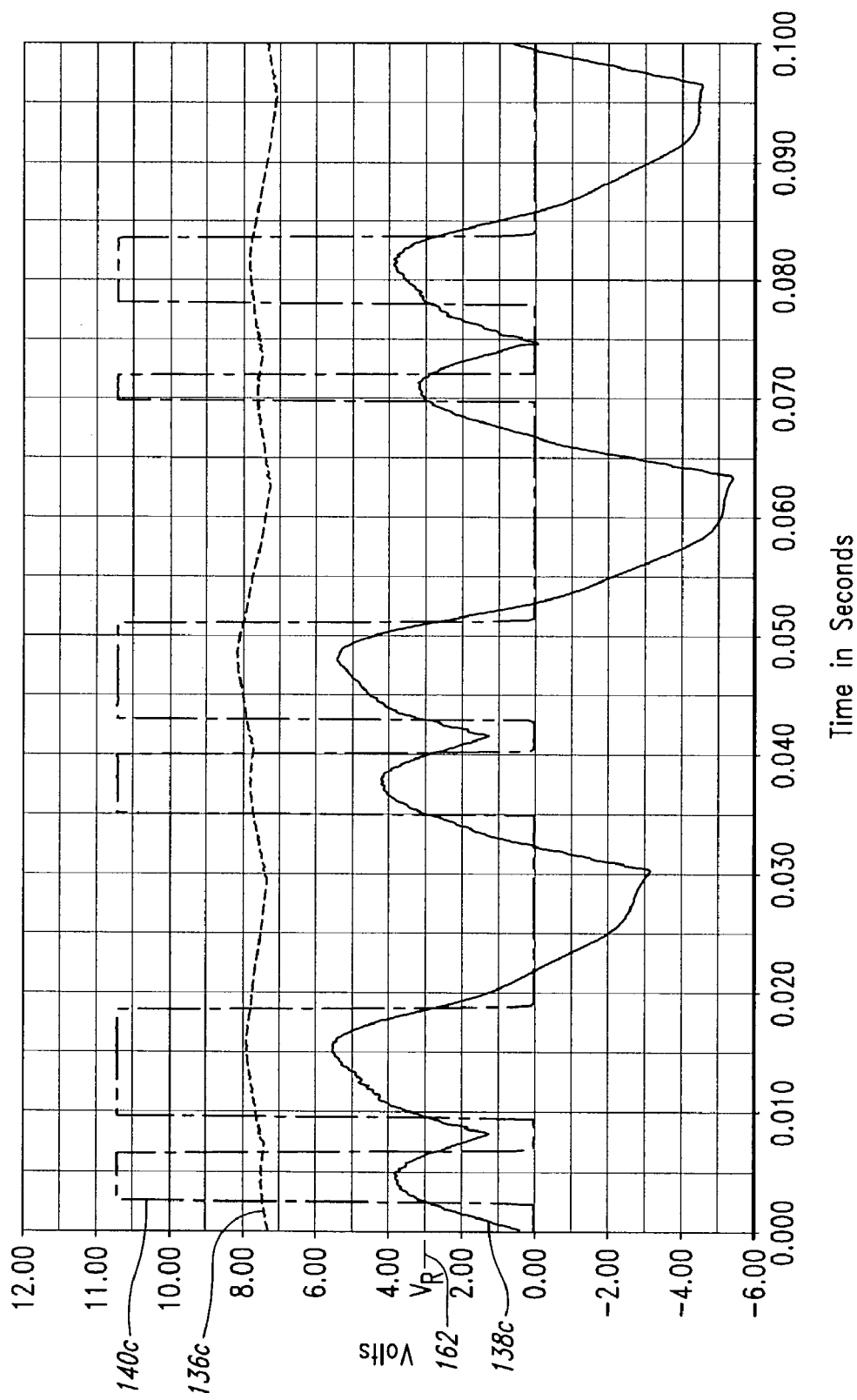

Referring now to FIG. 6, a similar graph is shown, in which an inlet check valve 112 has failed on one of the cylinders 102 of a three-cylinder pump 130. As may be observed, while the amplified AC signal 138c is different from the signals 138a or 138b of FIGS. 4 and 5, the digitized output 138c shows a similar degrading of the output frequency of the digitized signal 138c as compared to the nominally normal signal 138a of FIG. 4.

Figure 7:
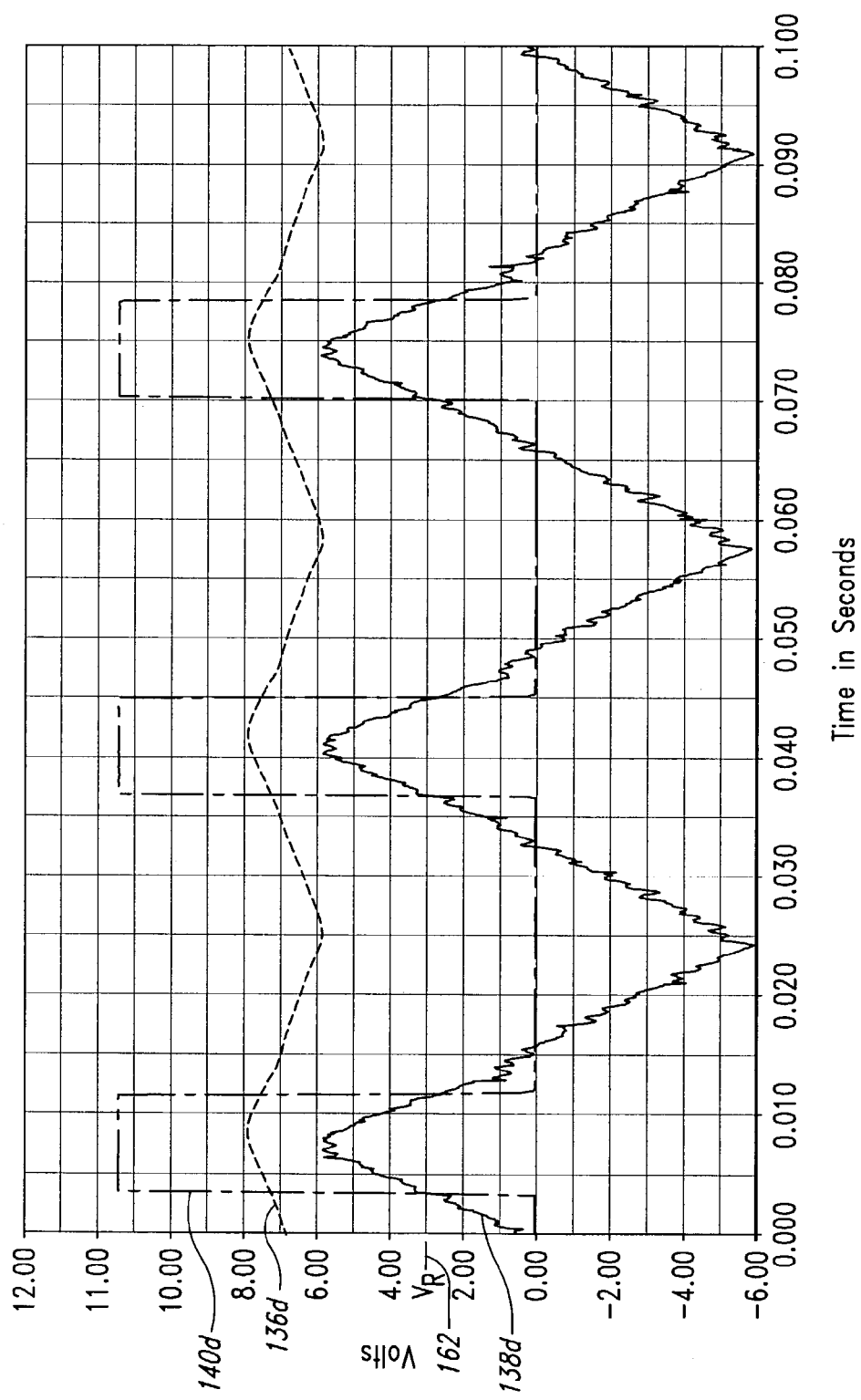

FIG. 7 illustrates a graph showing a failure of an outlet check valve 120 of a single cylinder 102. As explained in the background section, this failure may result in significant damage to a pump, if not promptly detected. This failure is characterized by a triangle wave signal of the AC component of the transducer output, which is clearly visible in both the output line 136d and the amplified AC component 138d. The peaks of the wave correspond to the pressurizing strokes of the affected cylinder. This is understandable when one considers that, when the outlet check valve remains open, fluid from the high-pressure manifold 132 is driven, by the pressure provided by the remaining cylinders, back into the affected cylinder during the intake stroke. As a result, the pressure in the manifold is dominated by the movement of the plunger 108 of the affected cylinder. The digital output signal 140d resulting from such a failure is a signal having a frequency one third the frequency of a normally operating pump.

It will be recognized that the frequency of the digital output signal 140a of a healthy pump 130 is related to the rpm's of the crankshaft 110 of the pump, or of the power source being used to drive the pump 130. This relationship may be stated thus: the output frequency f is equal to rpm *x/60, where x is the number of cylinders in the pump and the divisor 60 reduces the figure to a per-second value. Therefore, by comparing the output frequency 140 with a reference frequency f, malfunctions in the pump may be detected as they occur.

FIG. 8 illustrates, in diagrammatic form, a circuit and method for detecting failures in a pump. According to an embodiment of the invention, the crankshaft 110 of the pump 130 includes a black or nonreflective mark 150 thereon. A photo detector 142 detects the mark 140 against the otherwise reflective shaft 110, as it rotates under the detector 142. The detector 142 provides an output signal 158 that has a frequency equal to the revolutions per second of the crankshaft 110. A frequency multiplier circuit 144 multiplies the signal 158 by the number of cylinders 102, resulting in a reference frequency 160 that corresponds to the total number of cylinder strokes per second of the pump 130. At the same time, the transducer 134 provides a voltage signal 136 that corresponds to the pressure of the intake manifold 132. A signal conditioning circuit 152 extracts the AC component of the transducer signal 136, which is then amplified to produce the amplified AC signal 138. A comparator 148, functioning as a digitizer, converts the amplified signal 138 to a digital output 140, by comparing it to reference voltage 162. The digital output 140 and the reference frequency 160 are each supplied to an input of a frequency comparator circuit 146, which provides an output 163 having a first digital value while the frequency of the output signal 140 is equal to, or exceeds the reference frequency 160. If the frequency 140 drops below the reference frequency 160, the frequency comparator 146 produces a second digital value to a shutdown circuit 154, which shuts off power to the pump 130. Alternatively, the frequency comparator circuit 146 may be configured to indicate a first error condition if the digital output signal 140 is approximately two-thirds the reference frequency 160, indicating a warning condition, and a second error condition if the output signal 140 is approximately one-third the reference frequency 160, indicating either a failure of two cylinders or a failure of an output check valve, prompting an automatic shutdown by the shutdown circuit 154.

According to an embodiment of the invention, the shutdown circuit 154 may be configured to incorporate a delay circuit, which will permit the system to overlook transients in the output signal 163, without shutting down the pump 130.

In another embodiment of the invention, the output 163 of the frequency comparator circuit 146 is provided to an alarm circuit (not shown), which notifies an operator of the malfunction. The operator may then manually shut down the pump 130.

According to an embodiment of the invention, a method is provided for determining which cylinder is malfunctioning. FIG. 8 illustrates a diagnostic circuit block 156, into which signals 158, 160, and 140 are fed through separate inputs. Signal 158, which is the output of the photo detector 142, indicates the pressure stroke of the plunger 108 of a first one of the three cylinders of the pump 130. Signal 160, which is the output of the multiplier circuit 144, indicates the pressure stroke of each of the three plungers 108 of the pump 130. By correlating the signal 158 to the signal 160, the pressurizing stroke of each cylinder may be isolated. Signal 140, which is the output of the converter 148, has a frequency that corresponds to the pressure stroke of each of the plungers. However, in the event that there is a malfunction in the pump, the cylinder in which that malfunction occurs will fail to produce a digital transition in the signal 140. By correlating the position of the missing transition to the signal 160, in which each pressure stroke is indicated, the cylinder having the malfunctioning component may be isolated. A failure of an outlet check valve is indicated by the simultaneous loss of digital transition of two cylinder positions in signal 140, indicating failure of the single cylinder still inducing a transition in the signal 140.

This information is provided at an output 164 of the diagnostic circuit. The output 164 may be configured to be coupled to a video screen, a digital readout, or other means of displaying or transmitting the data.

It will be recognized by one having ordinary skill in the art that the circuits and components described with reference to FIG. 8 need not be discrete components, but rather may be combined into one or more circuits or components. For example, the circuits and functions contained within the dashed line 166 of FIG. 8 may be incorporated as a fault detection module into the circuits and functions of a control panel that is also configured to manage other functions of the system, such as power on and off, valve controls for driving tools coupled to the system, static pressure levels of the system, etc.

Alternatively, many of the functions described with reference to FIG. 8 may instead be performed by an appropriately programmed computer. Additionally, similar solutions may be arrived at using components and circuits other than those described with reference to FIG. 8. For example, the positions of the plungers of the plurality of cylinders may be determined by means other than a combination of a photo detector and a mark on the crankshaft, such as sensors located on one or more of the individual plungers, or a magnetic pick up coupled to the crankshaft or a plunger. Additionally, according to some embodiments, it may be sufficient simply to detect a fault and shut down the pump, without isolating the cylinder at fault, in which case it is not necessary to correlate the position of the crankshaft 110 with the generation of the frequency signals 158 and 160. In such an event, a simple tachometer on the driving source of the pump may be sufficient to generate the required reference frequency.

Tests on pumps of the type described herein have shown that failures in the seals or valves of a multi-cylinder pump may be detected using the devices and methods described. In tests on pumps equipped with both the temperature sensing system previously described and with the pressure-based detecting system of the current invention, the temperature-based system showed a delay of between one and four hours response time to various faults, while the system based on the principles of the current invention showed an almost immediate response. It should also be noted that the hardware requirements of the device according to the present invention are much lower than those of the prior art, inasmuch as the invention described may employ a single sensor in the high-pressure manifold, as compared to as many as nine temperature sensors required under the previous system. Additionally, pressure transducers are commonly used on such pumps to monitor output pressure, meaning that the DC component of the signal 136 is of interest for other reasons, and thus the transducer 134 is not generally an added expense in the manufacture of the pump.

An examination of the amplified signal wave forms 138a–138d of FIGS. 4–7, will show that malfunctions of different components of a pump will produce distinct waveforms in the output. Thus, an examination of the amplified signal output 138, compared with the reference frequency 160, may be sufficient, not only to determine which cylinder is malfunctioning, but also the exact component that is responsible for the malfunction. Much of the information is lost when the amplified signal 138 is converted to a digital signal 140, such that, when the signals are processed as described with reference to FIGS. 4–8, the offending cylinder may be determined, but the specific component may not. However, for practical purposes, this is generally sufficient. It is common practice in the industry, when a pump cylinder malfunctions, to rebuild the entire cylinder by replacing all seals and moveable valve parts. Thus, a knowledge of the offending component is not necessary. Nevertheless, it is recognized that there may be some applications in which more information is desired than is available employing the method described. In such an event, it will be recognized that an analog circuit may be designed which will directly input the amplified signal 138, or alternatively, the digitization of the amplified signal 138 may be performed at a much higher resolution, in order to capture the individual characteristics of the signal, to produce a more complex digital signal, which may then be examined using specialized equipment or through the utilization of specialized software. All of the variations described are considered to be within the scope of the invention.

FIG. 9 illustrates an example of a pressurized fluid system 170 according to an embodiment of the invention. A multi-cylinder pump 130 is driven by an electric motor 172. Each of the cylinders 102 provides a pressurized stream of water to a high-pressure manifold 132. A transmission line 174 carries pressurized water to an x-y cutting table 176, where the stream is mixed with an abrasive and forced through a nozzle 178 for cutting material 180 on an upper surface of the table 176. The manifold 132 includes a transducer 134, which converts pressure values to a proportionate voltage signal 136, which is transmitted to a control panel 182. The control panel 182 comprises a fault detection circuit 166, which converts the proportionate voltage signal 136 to a digital signal 140, which is compared to a reference frequency 160. The fault detection circuit 166 is configured to detect a malfunctioning cylinder 102 by deviations of the digital signal 140 from the reference frequency 160, and to shut down the pump 130 in that event. The fault detection circuit 166 is further configured to indicate the malfunctioning cylinder 102 on a display 184 on the control panel 180. The control panel 182 is also configured to manage, in a known, way, other functions of the system, such as power on and off, valve controls for driving tools coupled to the system, x and y orientation of the cutting nozzle 178, static pressure levels of the system, etc.

While the invention has been described with reference to a particular type of fluid pump, it will be recognized that the principles of this invention may be applied to other types of fluid pumps, including pumps having a different number of cylinders, pumps used for different purposes than those listed, pumps used for hydraulic actuation systems, etc.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A device, comprising:
   means for converting pressure levels of a high-pressure manifold of a fluid pump having a plurality of cylinders to a proportionate voltage signal; and
   means for detecting a malfunction in a component of one of the plurality of cylinders by examination of an AC component of the voltage signal, the detecting means including means for comparing the AC component of the voltage signal to a reference frequency, the detecting means further including means for converting the AC component of the voltage sianal to a digital signal for comparison to the reference frequency.

2. The device of claim 1 wherein the detecting means includes means for comparing the frequency of the AC component of the voltage signal to a reference frequency.

3. The device of claim 1 wherein the reference frequency is equal to a number of revolutions per second of the fluid pump multiplied by the number of cylinders of the pump.

4. A device comprising:
   means for converting pressure levels of a high-pressure manifold of a fluid pump having a plurality of cylinders to a proportionate voltage signal; and
   means for detecting a malfunction in a component of one of the plurality of cylinders by examination of an AC component of the voltage signal, the detecting means including means for comparing the AC component of the voltage signal to a reference frequency, the detecting means further including means for correlating a peak of the reference frequency to a compression stroke of one of the plurality of cylinders.

5. A device, comprising:
   a pressure transducer configured to be coupled to a high-pressure manifold of a multi-cylinder pump and provide an output voltage signal proportionate to a pressure input;
   a digitizer circuit having an input coupled to the output of the transducer and configured to convert an AC component of the voltage signal to a digital signal, in which a first digital value is supplied at a digitizer output while the voltage signal is below a selected threshold voltage, and a second digital value is supplied at the digitizer output while the voltage signal is above the selected threshold voltage; and a diagnostic circuit having an input coupled to the digitizer output and configured to diagnose malfunctions of the pump based upon the digital signal.

6. The device of claim 5 wherein the diagnostic circuit is configured to compare the frequency of the digital signal to a reference frequency.

7. The device of claim 6 wherein the reference frequency is equal to a number of revolutions per second of a motor driving the pump multiplied by the number of cylinders of the pump.

8. The device of claim 6 wherein the diagnostic circuit is configured to indicate a malfunction when the frequency of the digital signal is not equal to the reference frequency.

9. The device of claim 8 wherein the diagnostic circuit is configured to indicate a first category of malfunction when the frequency of the digital signal is lower than the reference frequency but higher than a selected fraction of the reference frequency, and to indicate a second category of malfunction when the frequency of the digital signal is lower than the selected fraction of the reference frequency.

10. The device of claim 5 wherein the threshold voltage represents an acceptable pressure level of the manifold during a pressurizing stroke of the pump.

11. The device of claim 10 wherein the threshold voltage is selectable according to a desired sensitivity of the diagnostic circuit.

12. The device of claim 5 wherein the diagnostic circuit is configured to correlate pressurizing strokes of each cylinder of the pump to corresponding peaks of a reference frequency, to compare, peak for peak, the reference frequency with the digital signal, and to indicate, when the reference frequency exhibits a peak for which no corresponding peak is produced in the digital signal, a malfunction in the cylinder corresponding to the exhibited peak.

13. The device of claim 5 wherein the digital signal is an alternating signal.

14. A system, comprising:
a pump having a plurality of cylinders, each of the cylinders having an outlet port;
a high-pressure manifold having a plurality of inlets, each of the inlets being coupled to one of the outlet ports;
a pressure transducer having an input sensor coupled to the manifold and configured to convert pressure levels of fluid in the manifold to a voltage signal at an output of the transducer;
a digitizer having an input coupled to the output of the transducer and configured to convert the voltage signal from the transducer to a digital signal at a digitizer output, such that when a value of the voltage signal is less than a selected reference voltage a first digital value is produced and when the voltage level exceeds the selected reference voltage a second digital value is produced; and
a diagnostic circuit having an input coupled to the digitizer output and configured to detect malfunctions of the pump based upon the digital signal.

15. The system of claim 14 wherein the diagnostic circuit is configured to compare a frequency of the digital signal with a reference frequency.

16. The system of claim 15 wherein the pump comprises a crankshaft to which is linked a plurality of drive rods, one for each of the plurality of cylinders, and wherein the reference frequency is derived from the revolutions per second of the crankshaft multiplied by the number of cylinders in the plurality of cylinders.

17. The system of claim 15 wherein the diagnostic circuit is configured to indicate a malfunction when the frequency of the digital signal does not match the reference frequency.

18. The system of claim 14, further comprising a shut-off circuit coupled to an output of the diagnostic circuit, configured to shut off power to the pump in the event that a malfunction is detected.

19. The system of claim 16, further comprising a motor coupled to the crankshaft and configured to provide power thereto.

20. The system of claim 14, further comprising a tool coupled to an output line of the high-pressure manifold and configured to utilize pressurized fluid from the manifold.

21. The system of claim 20 wherein the tool is a cutting head, configured to direct a high-pressure stream of fluid through a nozzle to cut selected material.

22. The system of claim 20, further comprising an additional tool coupled to an additional output line of the manifold.

23. A method, comprising:
converting pressure levels at a high-pressure manifold of a multi-cylinder pump to a proportionate voltage signal;
detecting a malfunction in a component of one of the plurality of cylinders by converting an AC component of the voltage signal to a digital signal; and
comparing a frequency of the digital signal to a reference frequency.

24. The method of claim 23 wherein the converting step is performed by a pressure transducer.

25. The method of claim 23 wherein the reference frequency is correlated to a total number of compression strokes of all of the plurality of cylinders of the multi-cylinder pump, per second.

26. A method, comprising:
converting fluid pressure to a voltage signal;
comparing the voltage signal to a reference voltage;
supplying a first digital value as an output signal while the voltage signal exceeds the reference voltage;
supplying a second digital value as the output signal while the voltage signal does not exceed the reference voltage; and
comparing a frequency of the output signal to a reference frequency.

27. The method of claim 25 wherein the detecting a malfunction step includes:
correlating compression strokes of each of the cylinders with corresponding peaks of the reference frequency;
comparing, peak for peak, the digital signal frequency with the reference frequency;
detecting a peak of the reference frequency for which no corresponding peak is present in the digital signal frequency; and
indicating the cylinder corresponding to the detected peak as including the malfunctioning component.

* * * * *